United States Patent
Rai et al.

(10) Patent No.: US 8,723,855 B2
(45) Date of Patent: May 13, 2014

(54) ON-CHIP POWER-DOWN GENERATION FOR LDO-BASED MUTUAL CAPACITANCE TOUCHSCREEN CONTROLLERS

(75) Inventors: Abhay Kumar Rai, Fort Collins, CO (US); Michael John Brosnan, Fremont, CA (US)

(73) Assignee: Pixart Imaging Inc., Hsin-Chu (TW)

( * ) Notice: Subject to any disclaimer, the term of this patent is extended or adjusted under 35 U.S.C. 154(b) by 394 days.

(21) Appl. No.: 13/306,954

(22) Filed: Nov. 29, 2011

(65) Prior Publication Data

US 2013/0135245 A1 May 30, 2013

(51) Int. Cl.
*G06F 3/044* (2006.01)

(52) U.S. Cl.
USPC .......................... 345/212; 345/173; 345/204

(58) Field of Classification Search
USPC ............... 345/173–176, 204, 212; 178/18.06; 713/324, 320
See application file for complete search history.

(56) References Cited

U.S. PATENT DOCUMENTS

| | | | |
|---|---|---|---|
| 8,552,703 B2 * | 10/2013 | Liu et al. | 323/283 |
| 2008/0307240 A1 | 12/2008 | Dahan et al. | |
| 2009/0153108 A1 | 6/2009 | Hendin et al. | |
| 2009/0322725 A1 * | 12/2009 | David et al. | 345/211 |
| 2010/0064160 A1 | 3/2010 | Wilson et al. | |
| 2010/0156839 A1 | 6/2010 | Ellis | |
| 2011/0128277 A1 * | 6/2011 | Murakami | 345/212 |

* cited by examiner

*Primary Examiner* — Andrew Sasinowski
(74) *Attorney, Agent, or Firm* — McClure, Qualey & Rodack, LLP (57) ABSTRACT

Various embodiments of methods and devices are provided for a mutual capacitance touchscreen controller comprising a first on-chip low drop out regulator (LDO) configured to receive and regulate as a first input thereto an input supply voltage (VSUPPLY), and to provide as an output therefrom a first regulated output voltage (VDDA). A first comparator in the controller is configured to receive as first and second inputs thereto VSUPPLY and VDDA and to provide as an output therefrom a signal EN, EN being provided to the first LDO as a second input thereto. The first LDO is configured to operate in a first off mode and is turned off by signal EN when the difference between VSUPPLY and VDDA is less than a predetermined threshold.

21 Claims, 9 Drawing Sheets

ON-CHIP POWER-DOWN GENERATION FOR LDO-BASED MUTUAL CAPACITANCE TOUCHSCREEN CONTROLLERS

FIELD OF THE INVENTION

Various embodiments of the invention described herein relate to the field of touchscreen controllers or processors, and more particularly to means and methods of conserving power required by same.

BACKGROUND

With the preponderance of capacitive touchscreen sensor interfaces, the industry demands high signal-to-noise ratios (SNR) to impart reliable performance and to overcome the presence of various types of noise in the environments in which touchscreens typically operate. Such noise includes, for example, noise generated by LCDs, power supplies and environmental noise. These requirements generally impose a need for touchscreen controllers to be supplied with clean ripple-free power, which is typically delivered to an analog core in the touchscreen controller, as well as to touchscreen drive lines operably connected to the touchscreen controller. As a result, on-chip low drop-out regulators (LDOs) are often used to provide clean, ripple free power supplies for touchscreen controllers.

Since capacitive touchscreen controllers are used in many hand-held consumer applications, very low power consumption is required of them. If a clean ripple-free power supply is employed in a touchscreen controller, LDOs in the controller may be configured to shut down to provide additional power savings. Power down signals EN can be delivered to a touchscreen controller by an external pin, but doing so requires additional hardware.

What is needed is a touchscreen controller that consumes little power but that does not require additional pins or hardware.

SUMMARY

In one embodiment, there is provided a touchscreen controller comprising an analog core comprising touchscreen sense circuitry configured to be operably connected to touchscreen sense lines external to the controller, a first on-chip low drop out regulator (LDO) configured to receive and regulate as a first input thereto an input supply voltage (VSUPPLY), and to provide as an output therefrom a first regulated output voltage (VDDA), a first comparator configured to receive as first and second inputs thereto VSUPPLY and VDDA and to provide as an output therefrom a signal EN, EN being provided to the first LDO as a second input thereto, wherein the first LDO is configured to operate in a first off mode and is turned off by signal EN when the difference between VSUPPLY and VDDA is less than a predetermined threshold, and the touchscreen controller is configured to operate in an LDO mode wherein VDDA is provided as an output from the first LDO when the difference between VSUPPLY and VDDA is greater than or equal to the predetermined threshold and the first LDO is turned on and operating in a second on mode.

In another embodiment, there is provided a method of operating a touchscreen controller comprising providing an analog core comprising touchscreen sense circuitry configured to be operably connected to touchscreen sense lines external to the controller, providing an input supply voltage (VSUPPLY) to a first on-chip low drop out regulator (LDO) as a first input thereto and generating a regulated output voltage VDDA therefrom, providing VSUPPLY and VDDA to a comparator and generating as an output therefrom a signal EN, EN being provided to the first LDO as a second input thereto, operating the first LDO in a first off mode where the first LDO is turned off by signal EN when the difference between VSUPPLY and VDDA is less than a predetermined threshold, operating the touchscreen controller in an LDO mode when the difference between VSUPPLY and VDDA is greater than or equal to the predetermined threshold and the first LDO is turned on and operating in a second on mode.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
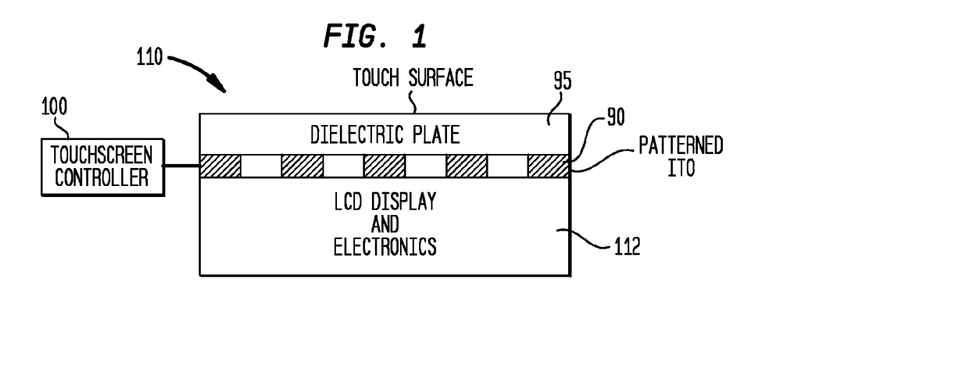
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
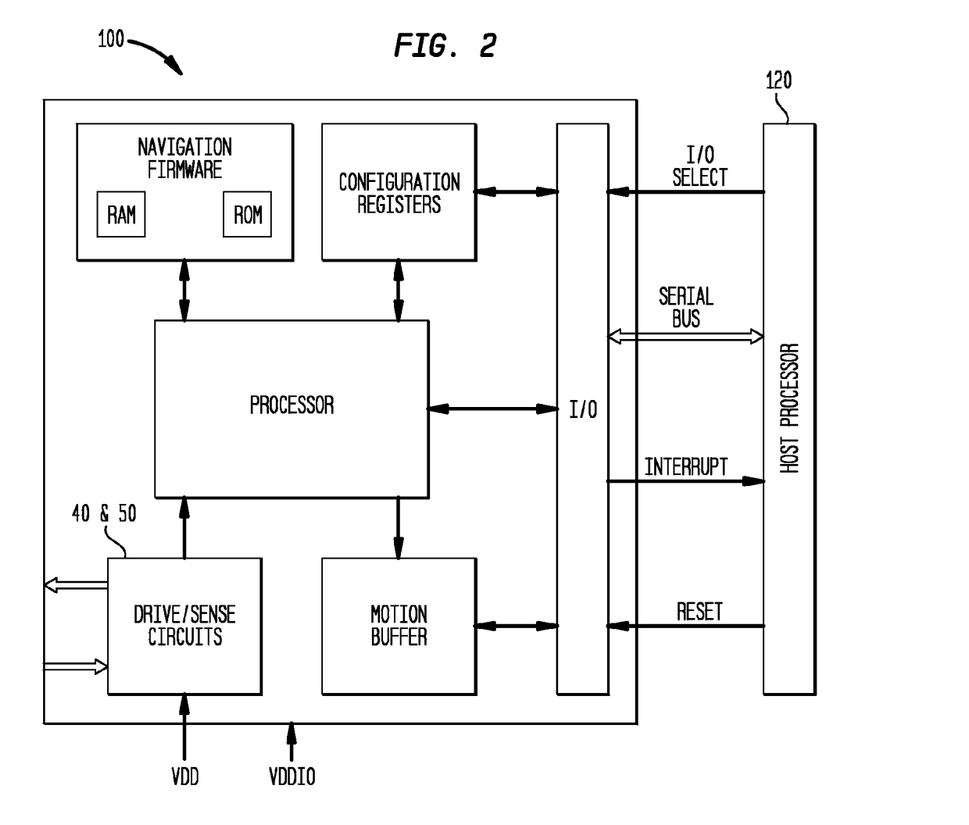
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
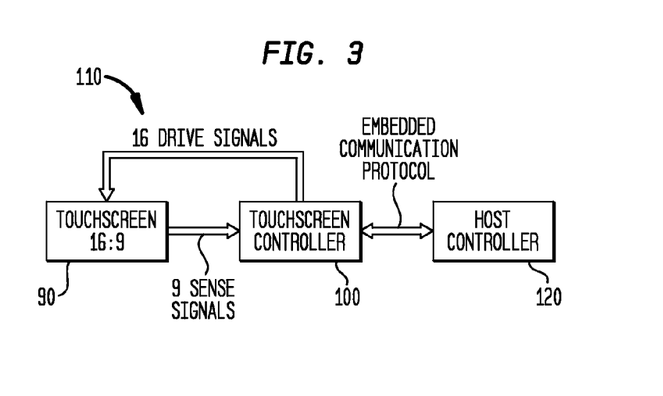
FIG. 3 shows one embodiment of a block diagram of a capacitive touchscreen system and a host controller.
Figure 4:
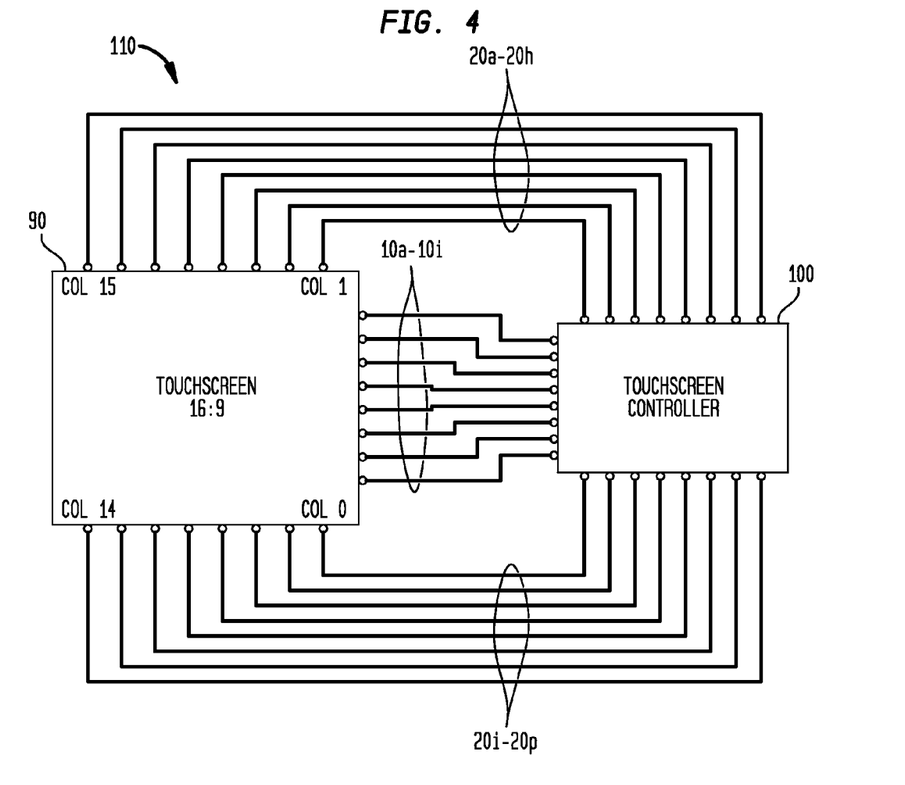
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 16 drive signal lines and 9 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode.

According to one embodiment, and as shown in FIG. 4, an ITO grid or other electrode configuration on touchscreen 90 comprises sense columns 20a-20p and drive rows 10a-10i, where sense columns 20a-20p are operably connected to corresponding sense circuits and rows 10a-10i are operably connected to corresponding drive circuits. One configuration for routing ITO or other drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Referring now to FIGS. 5 through 11, there is disclosed a low-cost, low-power solution to the problem of requiring extra hardware when LDOs are employed in touchscreen controllers, more about which is said below. According to some embodiments, a power down signal (PD) is generated by measuring a difference between an input power supply voltage VSUPPLY and an analog supply voltage (VDDA), which eliminates the requirement for an additional pin and hardware to generate the PD. This, in turn, reduces the hardware requirements for power down generation in a touchscreen controller, and therefore provides a significant performance improvement.

Figure 5:
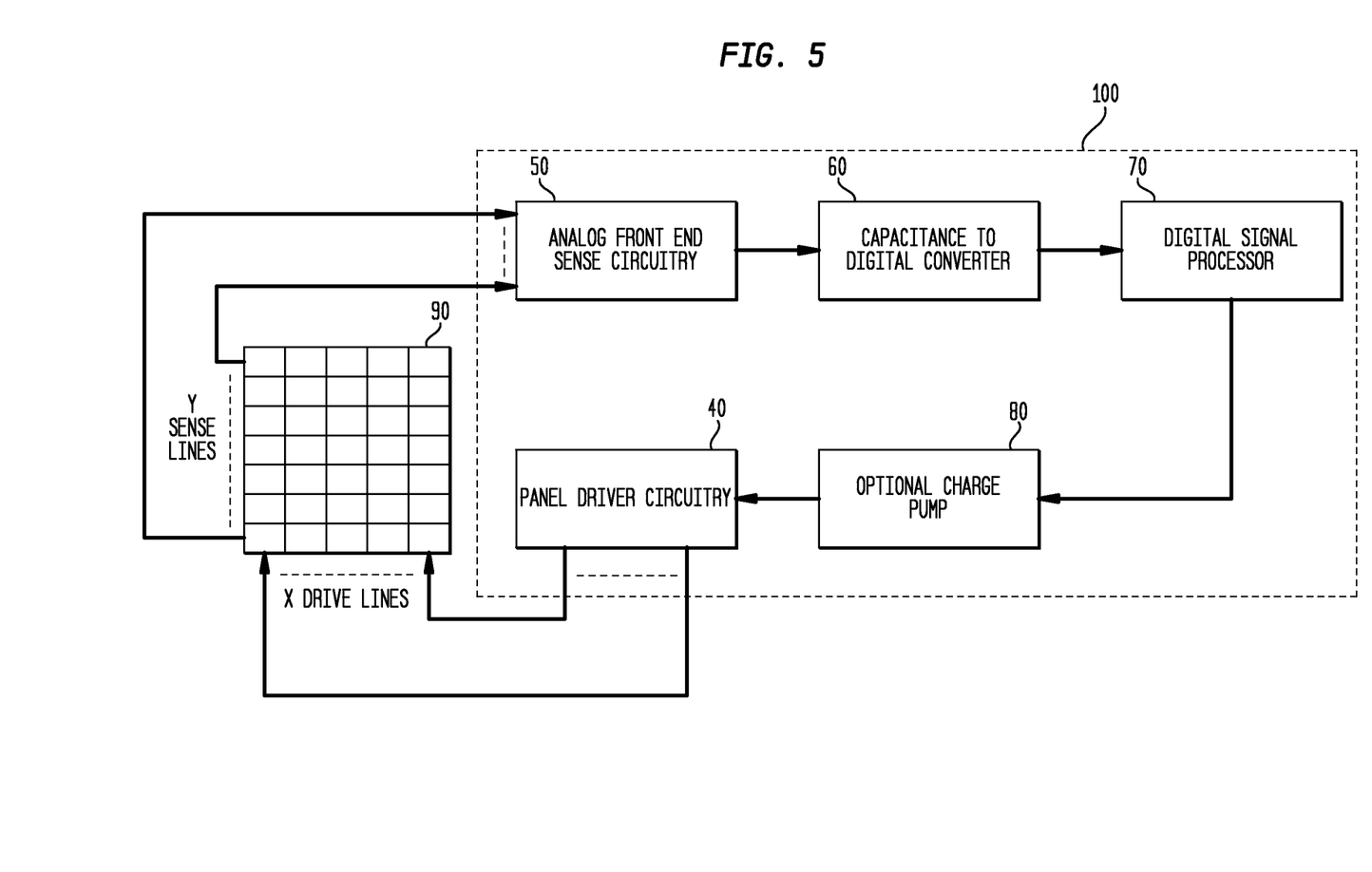
FIG. 5 shows one embodiment of a system level block diagram of touchscreen controller 100.

Referring now to FIG. 5, there is shown one embodiment of a system level block diagram of touchscreen controller 100. As described above, and according to one embodiment, touchscreen 90 comprises ITO pattern on a glass or plastic surface. This ITO pattern consists of X columns and Y rows, their number and density depending, among other considerations, on navigation accuracy requirements. In the embodiment of touchscreen controller 100 shown in FIG. 5, analog front end sense circuitry 50, capacitance to digital converter 60, digital signal processor 70, optional charge pump 80, and panel driver circuitry 40 form portions of touchscreen controller 100, which is a sensor interface chip or integrated circuit. The columns of touchscreen 90 are driven by column driver circuitry included inn panel driver circuitry 40, which is optimally configured to drive touchscreen 90 with a clean, ripple free and stable supply delivered by an on-chip low drop-out regulator (LDO), described in detail below. When a user's finger is presented to touchscreen 90, it results in change of capacitance which is sensed by analog front end circuitry 50 and then and converted to a digital signal by capacitance to digital converter 60. The resulting digital signals are then further processed by on-chip digital signal processor 70. To determine touch coordinates reliably, a high accuracy touchscreen controller 100 is desired, which requires a very high power supply rejection ratio (PSRR). To achieve such high PSRRs, on-chip LDOs are employed. To isolate digital switching noise that might otherwise be transmitted to analog core 150 (see FIGS. 6, 7 and 8), separate LDOs are employed for analog core 150 and digital core 140.

Figure 6:
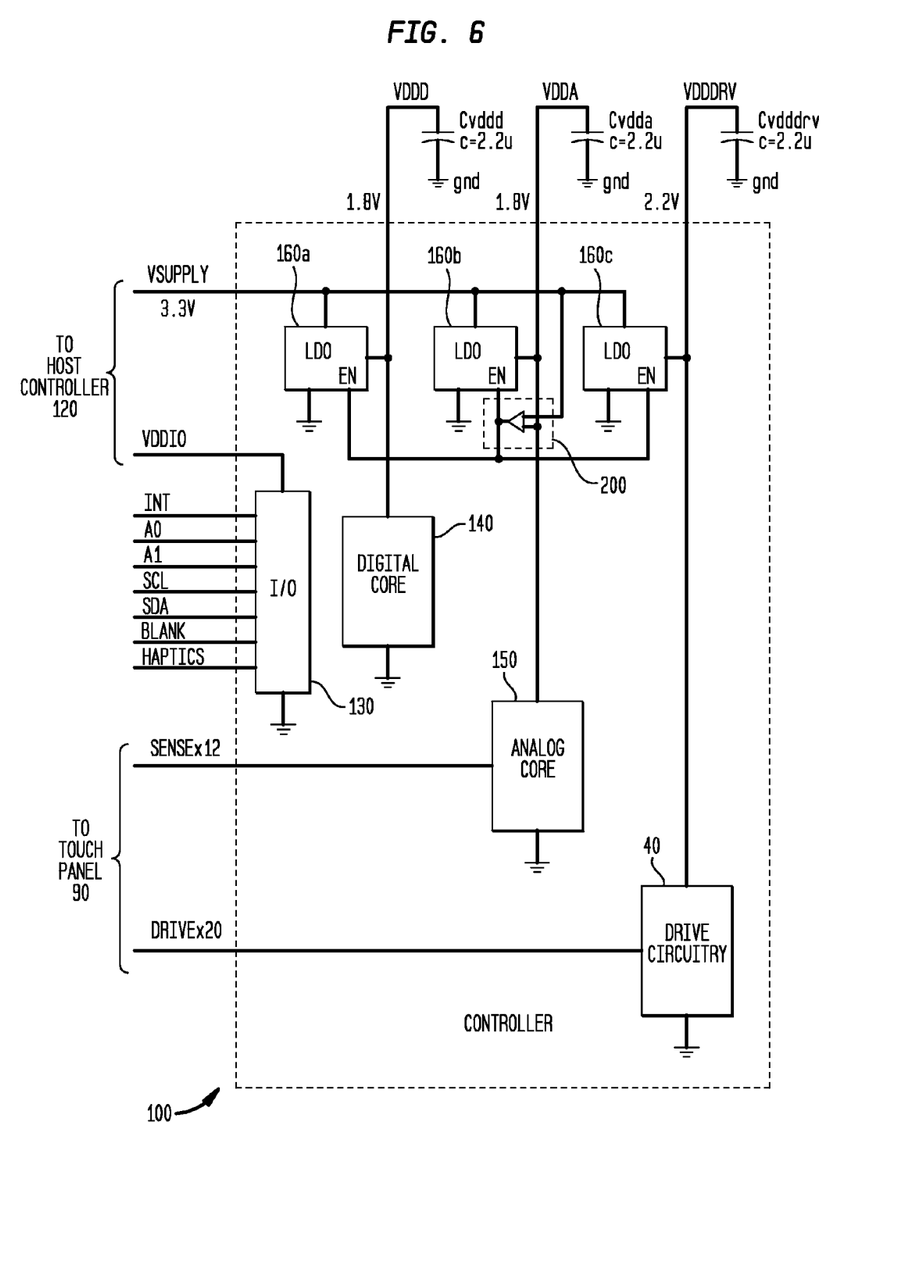
FIG. 6 shows one embodiment of a touchscreen controller comprising multiple LDOs.

FIG. 6 shows one embodiment of touchscreen controller 100 comprising multiple LDOs 160a, 160b and 160c, as employed in an AVAGO TECHNOLOGIES AMRI-5305 touchscreen controller. As shown in FIG. 6, three separate LDOs 160a, 160b and 160c supply power to analog core 150 (VDDA), digital core 140 (VDDD), and drive circuitry 40 (VDDDRV).

In touchscreen controller 100 of FIG. 6, LDOs 160a, 160b and 160c are operating in an enabled mode. As shown, a power down signal EN is employed to enable or power down LDOs 160a, 160b and 160c, and is generated internally on-chip in touchscreen controller 100. Power down signal EN is supplied to all of LDOs 160a, 160b and 160c by comparing input voltage VSUPPLY and one of the LDO voltages VDDA in comparator 200. According to one embodiment, if the supplied input VSUPPLY is 2.5 volts≤V_IN≤3.6 volts, power down signal EN is high, which enables all of LDOs 160a, 160b and 160c to operate respective on modes (otherwise referred to herein as LDO modes), where VDDA is about 1.8 volts.

Figure 7:
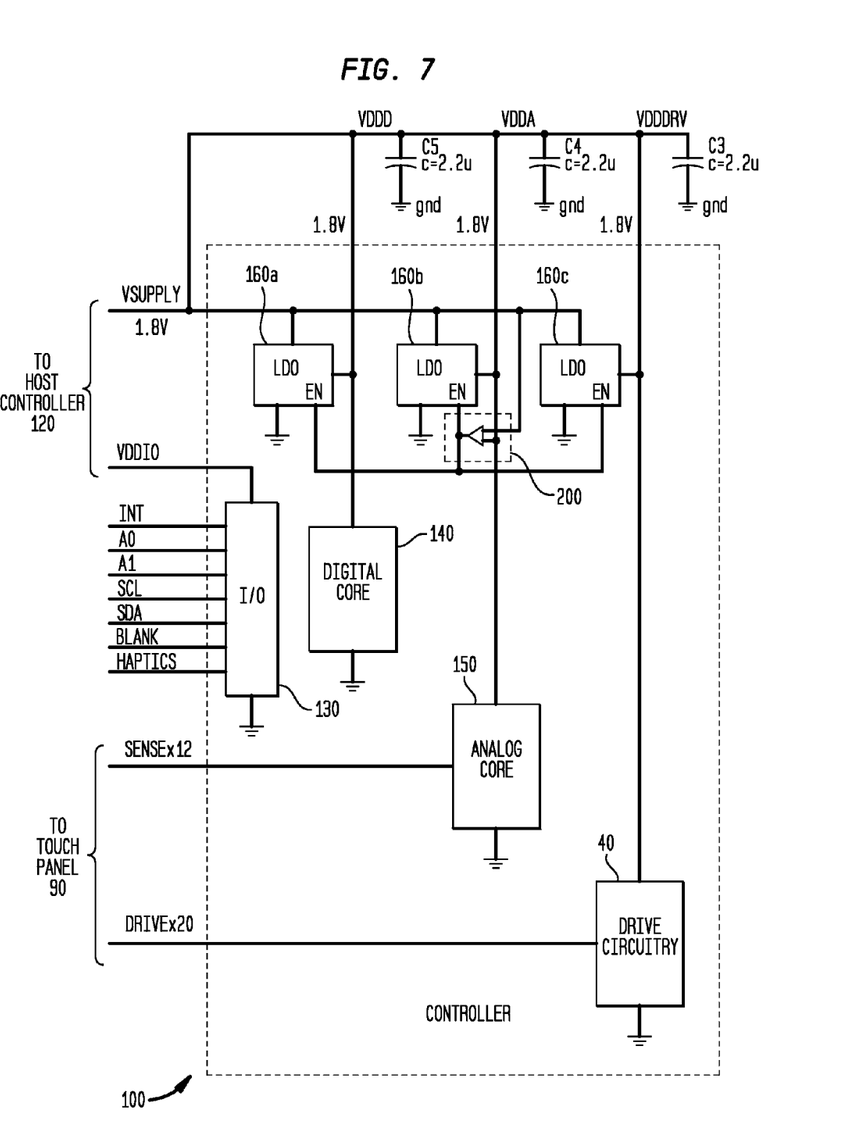
FIG. 7 shows one embodiment of a touchscreen controller having power supplies V_IN, VDDA, VDDD and VDDDRV tied together.

FIG. 7 shows one embodiment where touchscreen controller 100 is configured with power supplies V_IN, VDDA, VDDD and VDDDRV tied together and supplying voltages ranging between about 1.6 volts and about 2.0 volts. When power down signal EN goes low, power down signals EN are sent to all of LDOs 160a, 160b and 160c, which respond by entering respective power down or off modes, otherwise referred to herein as non-LDO modes.

Figure 8:
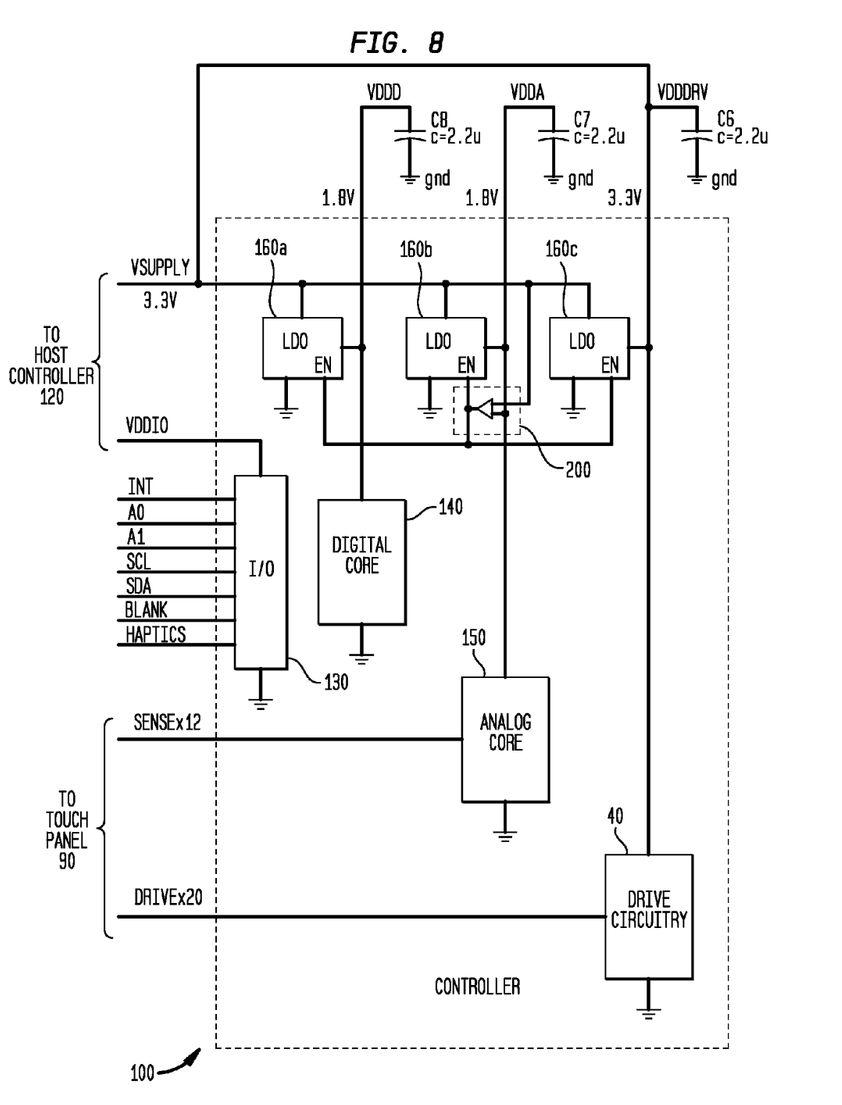
FIG. 8 shows an embodiment of a touchscreen controller having regulator outputs overdriven with high voltages.

FIG. 8 shows another embodiment of touchscreen controller 100 in which one of the regulator outputs for VDDDRV is overdriven with a higher voltage (VSUPPLY at 3.3 volts) so as to provide higher voltage drive signals and improve external noise immunity when VSUPPLY is sufficiently regulated.

Figure 9:
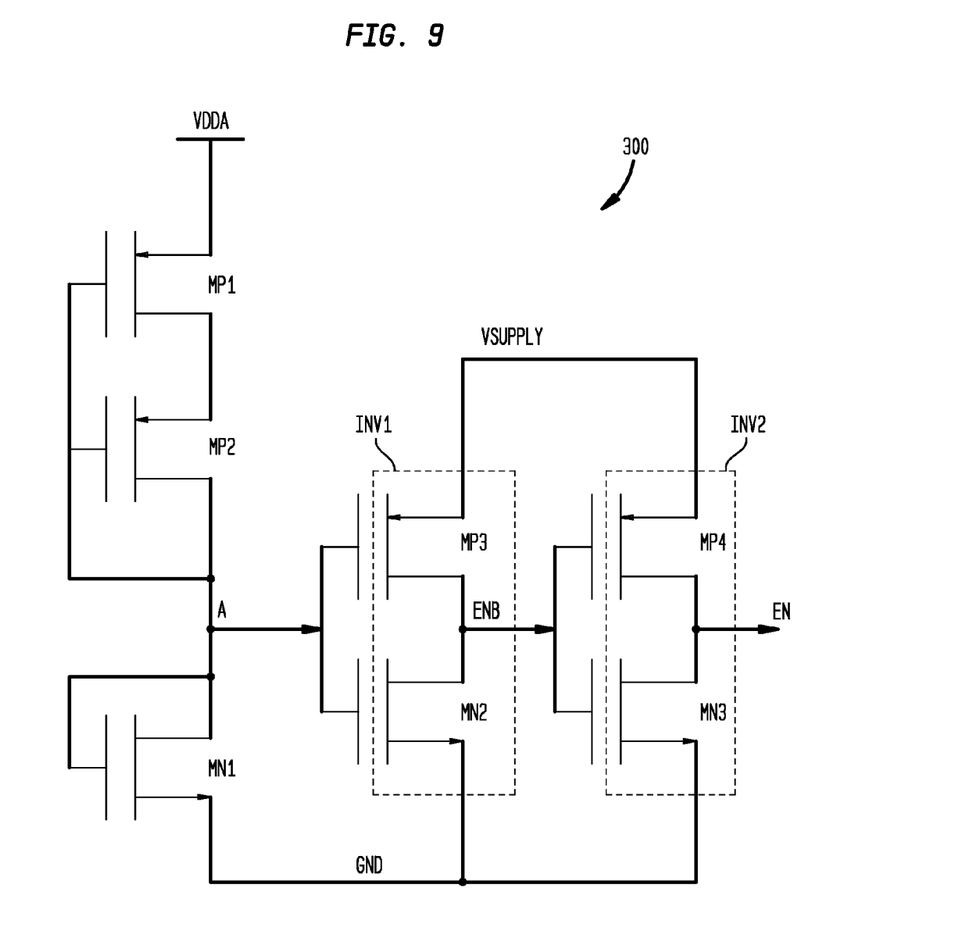
FIG. 9 shows one embodiment of power down signal generation circuitry configured to provide an on-chip power down signal EN for a touchscreen controller.

FIG. 9 shows one embodiment of power down signal generation circuitry 300 configured to provide on-chip power down signal EN in touchscreen controller 100. When touchscreen controller 100 and power down signal generation circuitry 300 are intended to be operated in an LDO or on mode, VSUPPLY has a voltage ranging between about between 2.5 volts and about 3.6 volts. VDDA is delivered by an LDO operating at about 1.8V. Signal A is generated by transistors MP1, MP2 and MN1, where transistors MP1-MP4 are PMOS field effect transistors, and where transistors MN1-MN3 are NMOS field effect transistors. Transistors MP3 and MN2 form first inverter INV1 and transistors MP4 and MN3 form second invertor INV2. When the LDO is operating In the LDO or on mode, internal signal A is always lower than the threshold of first inverter INV1, which in turn causes power down signal EN to be high. Second invertor INV2 generates a power down low signal (PD), which keeps the regulator enabled. In the non-LDO or off mode, and when VDDA and VSUPPLY are shorted together and supplied with a voltage ranging between about 1.6 volts and about 2.0 volts, transistors MP1, MP2 and MN1 generate an internal signal A that is higher than the threshold of inverter INV1, which in turn causes power down signal EN to be low. Inverter Inv2 generates power down signal EN, which is high.

Figure 10:
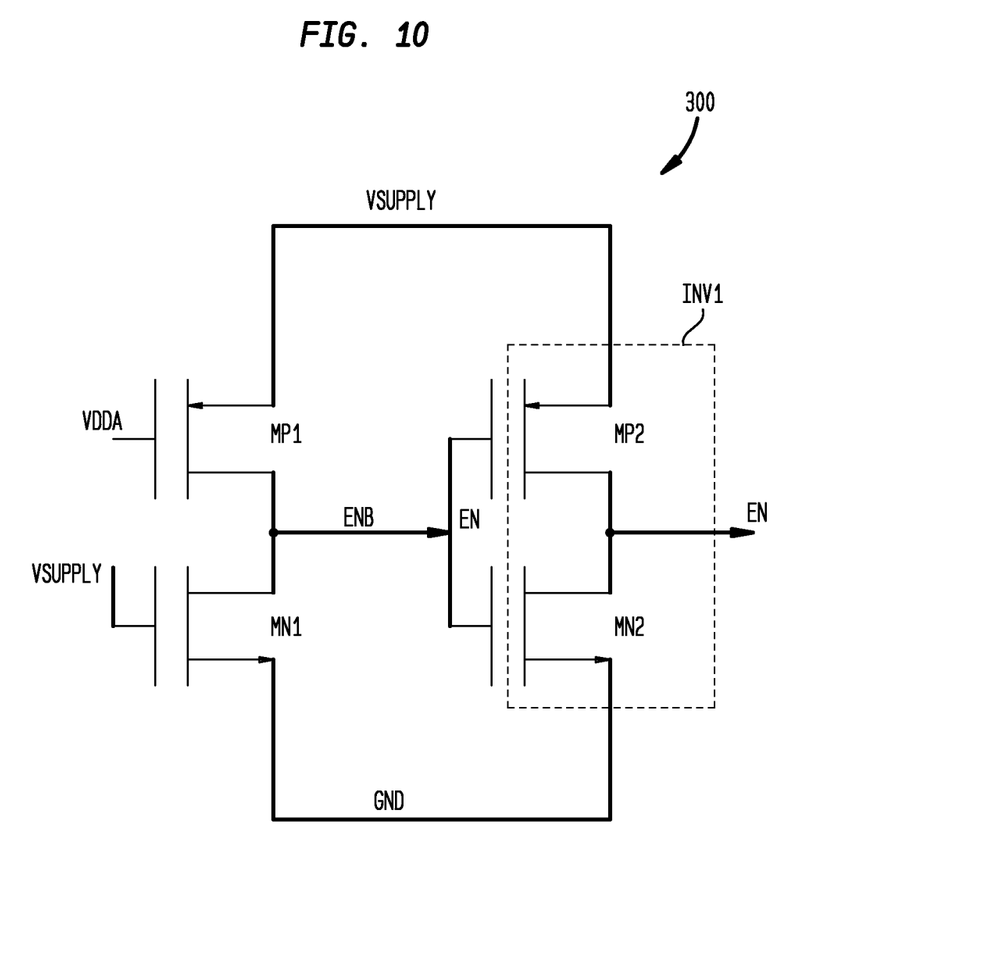
FIG. 10 shows another embodiment of power down signal generation circuitry configured to provide an on-chip power down signal EN for a touchscreen controller.

In another embodiment of power down signal generation circuitry 300 shown in FIG. 10, power efficiency is enhanced by signal ENB, which is directly generated by transistors MP1 and MN1. Power down signal EN is generated by invertor INV1 formed by transistors MP2 and MN2. In an LDO or on mode, and when VSUPPLY is >VDDA, transistor MP1 is on, power down signal ENB is high, and therefore inverter INV1 generates power down signal EN, which is low. In a non-LDO or off mode, and when VDDA=VSUPPLY, transistor MP1 is off, transistor MN1 is on, and power down signal ENB is therefore low. Inverter INV1 generates power down signal EN, which is high.

Figure 11:
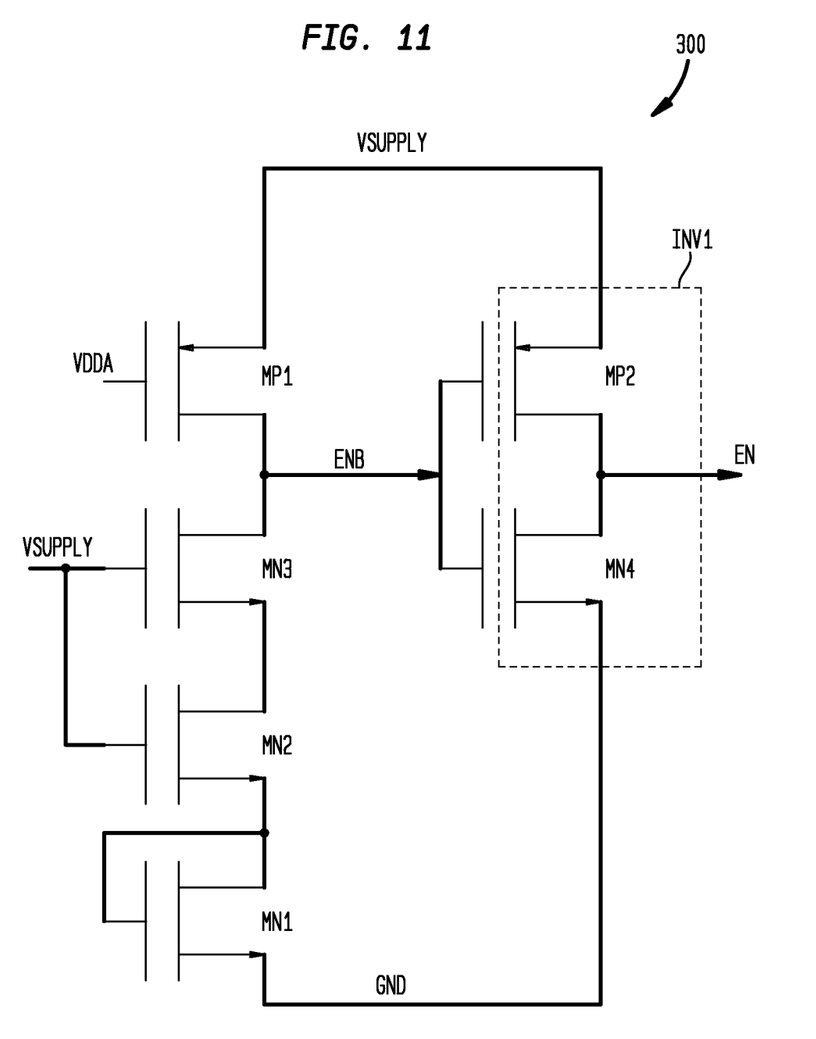
FIG. 11 shows yet another embodiment of power down signal generation circuitry configured to provide an on-chip power down signal EN for a touchscreen controller.

In yet another embodiment of power down signal generation circuitry 300 shown in FIG. 11, circuitry 300 is configured to operate under varying environmental, voltage supply and process conditions. Power down signal ENB is generated by transistor MP1 and transistors MN1-MN3. Power down signal EN is generated by inverter INV1 formed by transistors MP2 and MN4. In an LDO mode, where VSUPPLY is always greater than VDDA, power down signal EN is always higher than the high threshold of inverter INV1, and therefore inverter INV1 generates a power down signal PD that is low. In the LDO mode, transistor MN1 forms an NMOS weak path between power down signal EN and GND, an NMOS strong path between VSUPPLY to and power down signal EN. In the non-LDO or off mode, power down signal EN is lower than the low threshold of inverter INV1, which generates a power down signal PD that is high.

Referring now to FIGS. 5 through 11, it will be seen that there are disclosed herein a touchscreen controller 100, analog core 150, and touchscreen sense circuitry configured to be operably connected to touchscreen sense lines external to the controller. A first on-chip low drop out regulator (LDO) 160b is configured to receive and regulate as a first input thereto an input supply voltage (VSUPPLY), and to provide as an output therefrom a first regulated output voltage (VDDA). Comparator 200 is configured to receive as first and second inputs thereto VSUPPLY and VDDA and provides as an output therefrom a signal EN, where EN is provided to first LDO 160b as a second input thereto. The first LDO 160b is configured to operate in a first off or non-LDO mode when turned off by signal EN, which occurs when the difference between VSUPPLY and VDDA is less than a predetermined threshold. Touchscreen controller 100 is further configured to operate in an LDO or on mode when VDDA is provided as an output from first LDO 160b, and when the difference between VSUPPLY and VDDA is greater than or equal to the predetermined threshold, thereby causing first LDO 160b to be turned on and operate in a second on or LDO mode.

Further, and according to some embodiments, VSUPPLY may range between about 2.5 volts and about 3.6 volts, VDDA may range between about 1.75 volts and about 1.8 volts, the difference between VSUPPLY and VDDA may range between about 0.7 volts and about 1.8 volts, VDDA may range between about 1.75 volts and about 1.8 volts, and the predetermined threshold may range between about 0.2 volts and about 0.7 volts.

In still other embodiments, a second LDO 160a may be arranged electrically in parallel with first LDO 160b and be configured to receive signal EN from first LDO 160b as a first input thereto and to receive VSUPPLY as a second input thereto. Second LDO 160a may further be configured to operate in a third on or LDO mode and to provide a voltage VDDD as an output therefrom when first LDO 160b is operating in the second on or LDO mode. A third LDO 160c may also be arranged electrically in parallel with the first and second LDOs 160b and 160a, and be configured to receive signal EN from first LDO 160b as a first input thereto and to receive VSUPPLY as a second input thereto. Third LDO 160c may further be configured to operate in a fourth on or LDO mode, and to provide a voltage VDDRV as an output therefrom when first LDO 160b is operating in the second on or LDO mode.

In yet further embodiments, a method of operating touchscreen controller 100 is provided, where analog core 150 comprising touchscreen sense circuitry is configured to be operably connected to touchscreen sense lines external to the controller, an input supply voltage (VSUPPLY) is provided to first on-chip low drop out regulator (LDO) 160b as a first input thereto, and a regulated output voltage VDDA is generated thereby. VSUPPLY and VDDA are supplied to comparator 200, which generates as an output therefrom a signal EN, where power down signal EN is provided to first LDO 160b as a second input thereto. First LDO 160b operates in a first off or non-LDO mode when first LDO 160b is turned off by signal EN, and when the difference between VSUPPLY and VDDA is less than a predetermined threshold;. Touchscreen controller 100 operates in an LDO or on mode when the difference between VSUPPLY and VDDA is greater than or equal to the predetermined threshold, and when first LDO 160b is turned on and operating in a second on mode.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A mutual capacitance touchscreen controller, comprising:
   an analog core comprising touchscreen sense circuitry configured to be operably connected to capacitive touchscreen sense lines external to the controller;
   a first on-chip low drop out regulator (LDO) configured to receive and regulate as a first input thereto an input supply voltage (VSUPPLY), and to provide as an output therefrom a first regulated output voltage (VDDA);
   a first comparator configured to receive as first and second inputs thereto VSUPPLY and VDDA and to provide as an output therefrom a signal EN, EN being provided to the first LDO as a second input thereto;
   wherein the first LDO is configured to operate in a first off mode and is turned off by signal EN when the difference between VSUPPLY and VDDA is less than a predetermined threshold, and the touchscreen controller is configured to operate in an LDO mode wherein VDDA is provided as an output from the first LDO when the difference between VSUPPLY and VDDA is greater than or equal to the predetermined threshold and the first LDO is turned on and operating in a second on mode.

2. The touchscreen controller of claim 1, wherein VSUPPLY ranges between about 2.5 volts and about 3.6 volts.

3. The touchscreen controller of claim 1, wherein VDDA ranges between about 1.75 volts and about 1.8 volts.

4. The touchscreen controller of claim 1, wherein the difference between VSUPPLY and VDDA ranges between about 0.7 volts and about 1.8 volts.

5. The touchscreen controller of claim 1, wherein the predetermined threshold ranges between about 0.2 volts and about 0.7 volts.

6. The touchscreen controller of claim 1, wherein the analog core is operably connected to VDDA.

7. The touchscreen controller of claim 1, further comprising a second LDO arranged electrically in parallel with the first LDO and configured to receive signal EN from the first LDO as a first input thereto and to receive VSUPPLY as a second input thereto, the second LDO further being configured to operate in a third on mode and provide a voltage VDDD as an output therefrom when the first LDO is operating in the second on mode.

8. The touchscreen controller of claim 7, further comprising a digital core operably connected to the VDDD output of the second LDO.

9. The touchscreen controller of claim 7, further comprising a third LDO arranged electrically in parallel with the first and second LDOs and configured to receive signal EN from the first LDO as a first input thereto and to receive VSUPPLY as a second input thereto, the third LDO further being configured to operate in a fourth on LDO mode and provide a voltage VDDRV as an output therefrom when the first LDO is operating in the second on mode.

10. The touchscreen controller of claim 1, wherein the first LDO comprises PMOS field effect transistors.

11. The touchscreen controller of claim 1, further comprising drive circuitry operably connected to touchscreen drive lines external to the controller.

12. A method of operating a mutual capacitance touchscreen controller, comprising:
   providing an analog core comprising touchscreen sense circuitry configured to be operably connected to capacitive touchscreen sense lines external to the controller;
   providing an input supply voltage (VSUPPLY) to a first on-chip low drop out regulator (LDO) as a first input thereto and generating a regulated output voltage VDDA therefrom;
   providing VSUPPLY and VDDA to a comparator and generating as an output therefrom a signal EN, EN being provided to the first LDO as a second input thereto;
   operating the first LDO in a first off mode where the first LDO is turned off by signal EN when the difference between VSUPPLY and VDDA is less than a predetermined threshold;
   operating the touchscreen controller in an LDO mode when the difference between VSUPPLY and VDDA is greater than or equal to the predetermined threshold and the first LDO is turned on and operating in a second on mode.

13. The method of claim 12, wherein VSUPPLY ranges between about 2.5 volts and about 3.6 volts.

14. The method of claim 12, wherein VDDA ranges between about 1.75 volts and about 1.8 volts.

15. The method of claim 12, wherein the difference between VSUPPLY and VDDA ranges between about 0.7 volts and about 1.8 volts.

16. The method of claim 12, wherein the predetermined threshold ranges between about 0.2 volts and about 0.7 volts.

17. The method of claim 12, wherein the analog core is operably connected to VDDA and the first input of the LDO.

18. The method of claim 12, wherein a second LDO is arranged electrically in parallel with the first LDO and configured to receive signal EN from the first LDO as a first input thereto and to receive VSUPPLY as a second input thereto.

19. The method of claim 18, further comprising operating the second LDO in a third on mode and providing a voltage VDDD as an output therefrom when the first LDO is operating in the second on mode.

20. The method of claim 19, wherein a third LDO is arranged electrically in parallel with the first and second LDOs and configured to receive signal EN from the first LDO as a first input thereto and to receive VSUPPLY as a second input thereto.

21. The method of claim 20, further comprising operating the third LDO in a fourth on LDO mode and providing a voltage VDDRV as an output therefrom when the first LDO is operating in the second on mode.

* * * * *